US011563216B2

(12) United States Patent
Yoneda et al.

(10) Patent No.: US 11,563,216 B2
(45) Date of Patent: Jan. 24, 2023

(54) SECONDARY BATTERY AND MANUFACTURING METHOD OF SECONDARY BATTERY

(71) Applicant: Toyota Jidosha Kabushiki Kaisha, Toyota (JP)

(72) Inventors: Koshiro Yoneda, Ichinomiya (JP); Kosuke Suzuki, Toyota (JP); Takashi Nakazawa, Seto (JP); Takahiro Sakurai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 16/950,224

(22) Filed: Nov. 17, 2020

(65) Prior Publication Data

US 2021/0175510 A1 Jun. 10, 2021

(30) Foreign Application Priority Data

Dec. 4, 2019 (JP) .............................. JP2019-219873

(51) Int. Cl.
*H01M 50/46* (2021.01)
*H01M 50/543* (2021.01)
(Continued)

(52) U.S. Cl.
CPC ............. *H01M 4/66* (2013.01); *H01M 10/04* (2013.01); *H01M 10/0525* (2013.01); *H01M 50/46* (2021.01); *H01M 50/543* (2021.01); *H01M 2004/027* (2013.01); *H01M 2004/028* (2013.01); *H01M 2220/20* (2013.01)

(58) Field of Classification Search
CPC ...... H01M 4/66; H01M 50/543; H01M 50/46; H01M 50/40
See application file for complete search history.

(56) References Cited

U.S. PATENT DOCUMENTS

| | | | |
|---|---|---|---|
| 2013/0045402 A1* | 2/2013 | Takahashi | H01M 50/178 429/162 |
| 2013/0209849 A1* | 8/2013 | Hattori | H01M 50/533 429/211 |

(Continued)

FOREIGN PATENT DOCUMENTS

| | | |
|---|---|---|
| JP | 2010-282846 A | 12/2010 |
| JP | 2013-165054 A | 8/2013 |

(Continued)

*Primary Examiner* — Kenneth J Douyette
(74) *Attorney, Agent, or Firm* — Dinsmore & Shohl LLP

(57) ABSTRACT

A secondary battery includes an electrode body, a battery case, and an electrode terminal. The electrode body has a foil collecting portion. The electrode terminal corresponding to at least one of a positive electrode and a negative electrode is electrically connected to the foil collecting portion via a current collector terminal. The current collector terminal is joined to the foil collecting portion. The foil collecting portion has a joining mark composed of a plurality of recesses on a surface on an opposite side of the foil collecting portion from a surface joined to the current collector terminal. The joining mark has two corners on an inner side of the electrode body and two corners on an outer side of the electrode body, and only the two corners on the inner side of the electrode body have a chamfered shape.

8 Claims, 6 Drawing Sheets

(51) Int. Cl.
*H01M 4/66* (2006.01)
*H01M 10/0525* (2010.01)
*H01M 10/04* (2006.01)
*H01M 4/02* (2006.01)

(56) References Cited

U.S. PATENT DOCUMENTS

2015/0118568 A1* 4/2015 Ikeda ............... H01M 10/0431
    429/233
2018/0040918 A1* 2/2018 Guen ................. H01M 50/176
2018/0076424 A1  3/2018 Kato
2018/0183032 A1* 6/2018 Yamanaka ........ H01M 10/0431
2018/0375070 A1* 12/2018 Wakimoto .......... H01M 50/538

FOREIGN PATENT DOCUMENTS

| | | |
|---|---|---|
| JP | 2019-139954 A | 8/2019 |
| KR | 10-2019-0058428 A | 5/2019 |
| WO | 2013/105361 A1 | 7/2013 |

* cited by examiner

COMPARATIVE EXAMPLE

COMPARATIVE EXAMPLE

SECONDARY BATTERY AND MANUFACTURING METHOD OF SECONDARY BATTERY

CROSS-REFERENCE TO RELATED APPLICATION

This application claims priority to Japanese Patent Application No. 2019-219873 filed on Dec. 4, 2019, incorporated herein by reference in its entirety.

BACKGROUND

1. Technical Field

The present disclosure relates to a secondary battery and a method for manufacturing the secondary battery.

2. Description of Related Art

In recent years, secondary batteries such as lithium ion secondary batteries are suitably used as portable power sources for personal computers, mobile terminals, etc., and vehicle driving power sources for electric vehicles (EVs), hybrid vehicles (HVs), plug-in hybrid vehicles (PHVs), etc.

A secondary battery typically has a configuration in which an electrode body in which a positive electrode and a negative electrode are laminated via a separator is accommodated in a battery case. These electrodes generally have a configuration in which an active material layer is provided on a current collector foil, and these electrodes have a current collector foil exposed portion which functions as a current collector tab. The electrode body has a foil collecting portion in which the current collector foil exposed portion is gathered. In such a configuration, the electrode body is generally electrically connected to the electrode terminal attached to the battery case via the current collector terminal. For this connection, the current collector terminal and the foil collecting portion of the electrode body are ultrasonically joined to each other (for example, see Japanese Unexamined Patent Application Publication No. 2019-139954 (JP 2019-139954 A)). This ultrasonic joining is performed by, with the foil collecting portion of the electrode body and the current collector terminal interposed between a horn and an anvil, vibrating the horn while pressing the horn against the foil collecting portion toward the anvil. A recessed joining mark corresponding to protrusions of the tip of the horn is formed on the foil collecting portion.

SUMMARY

Higher output and higher energy density are required in secondary batteries used as vehicle driving power sources. For higher output and higher energy density, it is necessary to increase the volume of the active material layer in the battery case. In other words, it is necessary to reduce the volume of components other than the active material layer in the battery case.

The inventors of the disclosure attempted to reduce the distance between the foil collecting portion and the active material layer in order to increase the size of the active material layer, and also attempted to reduce the thickness of the separator in order to reduce the volume of components other than the active material layer. As a result, the following findings were obtained. An electrode body of a secondary battery used for a vehicle driving power source is a laminated body having a thickness of 10 mm or more and having a plurality of positive electrode layers and a plurality of negative electrode layers. As a result of reducing the distance between the foil collecting portion and the active material layer, the current collector foil exposed portion is greatly bent in the electrode of the outermost layer of the electrode body, so that the separator adjacent to the electrode of the outermost layer is interposed between the current collector foil exposed portion and the electrode, thereby applying stress to the separator. If the foil collecting portion of the electrode body and the current collector terminal are joined by ultrasonic joining in this state, the separator is likely to be damaged due to vibration during joining and reduced thickness of the separator. It has also been found that, depending on the horn shape of the ultrasonic joining apparatus, the anvil cuts the surface of the current collector terminal during ultrasonic joining, thereby generating foreign matter. Since the foreign matter has conductivity, a certain size or more of the foreign matter causes a short circuit.

As described above, when ultrasonically joining the foil collecting portion of the electrode body and the current collector terminal, the separator may be damaged and coarse foreign matter may be generated.

The disclosure provides a secondary battery in which damage to the separator is unlikely to occur and the generation of coarse foreign matter is suppressed during ultrasonic joining at manufacture.

A first aspect of the disclosure relates to a secondary battery. The secondary battery includes an electrode body including a positive electrode, a negative electrode, and a separator, a battery case accommodating the electrode body, and electrode terminals attached to the battery case and including a positive electrode terminal and a negative electrode terminal. At least one of the positive electrode and the negative electrode has an electrode current collector foil and an electrode active material layer provided on the electrode current collector foil. The at least one of the positive electrode and the negative electrode has an exposed portion where the electrode current collector foil is exposed. The electrode body has a foil collecting portion in which the exposed portion is gathered. The electrode terminal corresponding to the at least one of the positive electrode and the negative electrode is electrically connected to the foil collecting portion via a current collector terminal. The current collector terminal is joined to the foil collecting portion. The foil collecting portion has a joining mark composed of a plurality of recesses on a surface on an opposite side of a surface joined to the current collector terminal. The joining mark has two corners on an inner side of the electrode body and two corners on an outer side of the electrode body, and only the two corners on the inner side of the electrode body have a chamfered shape.

According to the above aspect, a secondary battery in which damage to the separator is unlikely to occur and generation of coarse foreign matter is suppressed during ultrasonic joining at manufacture is provided.

In the first aspect, the electrode body may have a thickness of 10 mm or more.

In the first aspect, the secondary battery may be a secondary battery used as a vehicle driving power source.

According to the above configuration, when the thickness of the electrode body is 10 mm or more, the separator is more likely to be damaged particularly when the secondary battery is used as a vehicle driving power source, so that the effect of the disclosure is further enhanced.

In the first aspect, the separator may have a thickness of 5 μm or more and 25 μm or less. According to the above configuration, when the thickness of the separator is 5 μm or more and 25 μm or less, the separator is more likely to be damaged, so that the effect of the disclosure is further enhanced.

In the first aspect, the electrode body may have a thickness of 25 mm or less.

In the first aspect, the separator may have a thickness of 10 μm or more and 20 μm or less.

In the first aspect, a length of the exposed portion may be larger than the thickness of the electrode body.

In the first aspect, the positive electrode may have a positive electrode current collector foil and a positive electrode active material layer provided on the positive electrode current collector foil. The negative electrode may have a negative electrode current collector foil and a negative electrode active material layer provided on the negative electrode current collector foil. The positive electrode may have a positive electrode current collector foil exposed portion where a part of the positive electrode current collector foil is exposed. The negative electrode may have a negative electrode current collector foil exposed portion where a part of the negative electrode current collector foil is exposed. The electrode body may have a positive electrode side foil collecting portion in which the positive electrode current collector foil exposed portion is gathered, and a negative electrode side foil collecting portion in which the negative electrode current collector foil exposed portion is gathered. The positive electrode terminal corresponding to the positive electrode may be electrically connected to the positive electrode side foil collecting portion via a positive electrode current collector terminal. The negative electrode terminal corresponding to the negative electrode may be electrically connected to the negative electrode side foil collecting portion via a negative electrode current collector terminal. The positive electrode current collector terminal may be joined to the positive electrode side foil collecting portion. The negative electrode current collector terminal may be joined to the negative electrode side foil collecting portion. The positive electrode side foil collecting portion may have a positive electrode side joining mark composed of a plurality of recesses on a surface on the opposite side of the positive electrode side foil collecting portion from a surface joined to the positive electrode current collector terminal. The negative electrode side foil collecting portion may have a negative electrode side joining mark on a surface on an opposite side of a surface joined to the negative electrode current collector terminal. At least one of the positive electrode side joining mark and the negative electrode side joining mark may have two corners on the inner side of the electrode body and two corners on the outer side of the electrode body, and only the two corners on the inner side of the of the electrode body may have a chamfered shape.

A second aspect of the disclosure relates to a manufacturing method of a secondary battery. The manufacturing method includes preparing an electrode body including a positive electrode, a negative electrode, and a separator. Here, at least one of the positive electrode and the negative electrode has an electrode current collector foil and an electrode active material layer provided on the electrode current collector foil. The at least one of the positive electrode and the negative electrode has an exposed portion where the electrode current collector foil is exposed. The electrode body has a foil collecting portion in which the exposed portion is gathered. The manufacturing method further includes interposing the foil collecting portion of the electrode body and a current collector terminal between a horn of an ultrasonic joining apparatus and an anvil of the ultrasonic joining apparatus. Here, the foil collecting portion contacts the horn and the current collector terminal contacts the anvil. The manufacturing method further includes vibrating the horn while pressing the horn toward the anvil to ultrasonically join the foil collecting portion and the current collector terminal, and constructing a lithium ion secondary battery using the electrode body to which the current collector terminal is attached. Here, a tip of the horn has a plurality of protrusions. A tip shape of the horn has four corners in a section perpendicular to a protruding direction of the protrusions. Among the four corners, only two of the corners are chamfered, and the two corners that are chamfered are provided adjacent to each other. In interposing the foil collecting portion and the current collector terminal, the horn is disposed such that the two corners that are chamfered are disposed on an inner side of the electrode body.

In the second aspect, the positive electrode may have a positive electrode current collector foil, a positive electrode active material layer provided on the positive electrode current collector foil, and a positive electrode current collector foil exposed portion where a part of the positive electrode current collector foil is exposed. The negative electrode may have a negative electrode current collector foil, a negative electrode active material layer provided on the negative electrode current collector foil, and a negative electrode current collector foil exposed portion where a part of the negative electrode current collector foil is exposed. The electrode body may have a positive electrode side foil collecting portion in which the positive electrode current collector foil exposed portion is gathered, and a negative electrode side foil collecting portion in which the negative electrode current collector foil exposed portion is gathered. Interposing the foil collecting portion of the electrode body and the current collector terminal between the horn and the anvil may include interposing the positive electrode side foil collecting portion and a positive electrode current collector terminal with the horn and the anvil. Vibrating the horn while pressing the horn toward the anvil to ultrasonically join the foil collecting portion and the current collector terminal may include vibrating the horn while pressing the horn toward the anvil to ultrasonically join the positive electrode side foil collecting portion and the positive electrode current collector terminal.

In the above aspect, interposing the foil collecting portion of the electrode body and the current collector terminal between the horn and the anvil may further include interposing the negative electrode side foil collecting portion and a negative electrode current collector terminal between the horn and the anvil. Vibrating the horn while pressing the horn toward the anvil to ultrasonically join the foil collecting portion and the current collector terminal may further include vibrating the horn while pressing the horn toward the anvil to ultrasonically join the negative electrode side foil collecting portion and the negative electrode current collector terminal. In interposing the positive electrode side foil collecting portion and the positive electrode current collector terminal, the horn may be disposed such that the two corners that are chamfered are disposed on the inner side of the electrode body, or/and in interposing the negative electrode side foil collecting portion and the negative electrode current collector terminal, the horn may be disposed such that the two corners that are chamfered are disposed on the inner side of the electrode body.

According to the aspects of the disclosure, a secondary battery in which damage to the separator is unlikely to occur and generation of coarse foreign matter is suppressed during ultrasonic joining at manufacture is provided.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
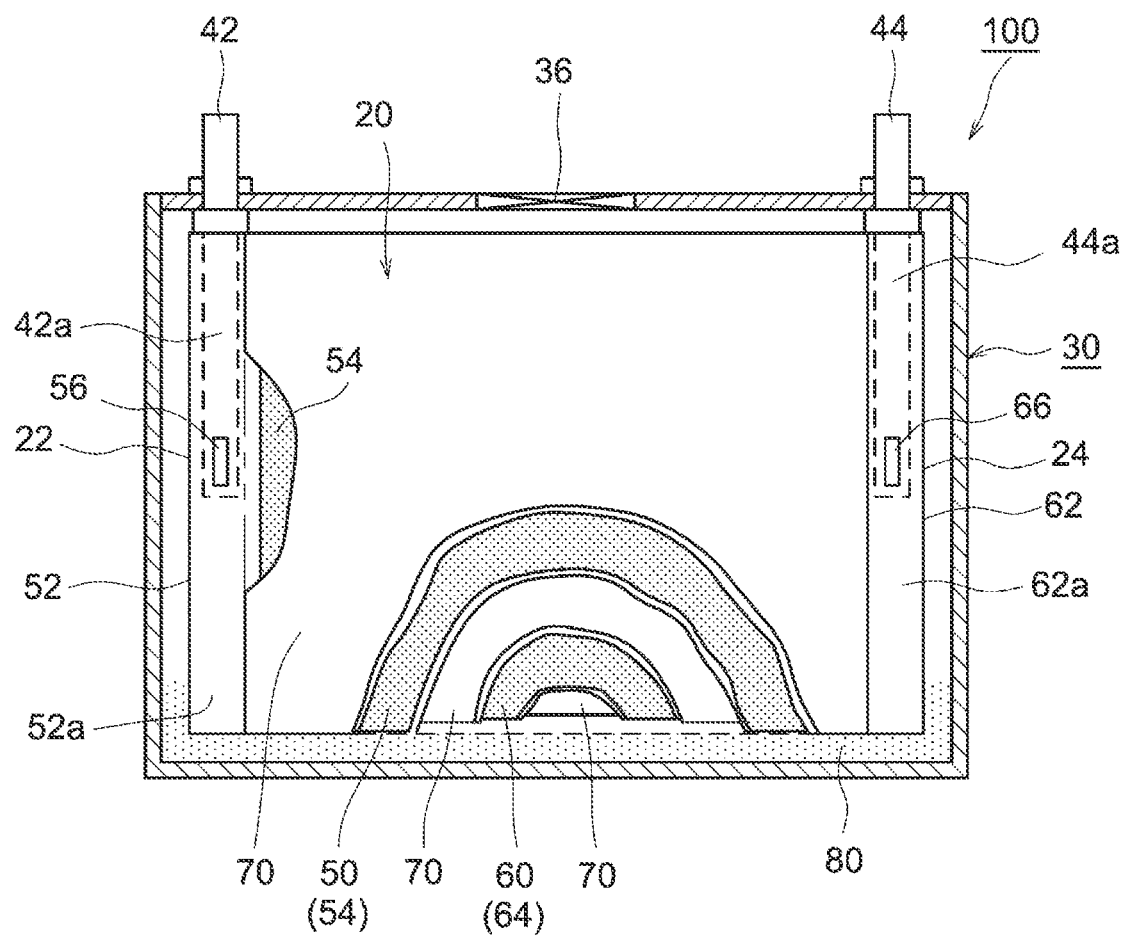
FIG. 1 is a front sectional view schematically showing an internal structure of a lithium ion secondary battery according to an embodiment of the disclosure.

Hereinafter, embodiments according to the disclosure will be described. Matters other than those particularly referred to in the present specification and necessary for carrying out the disclosure (for example, the general configuration and the manufacturing process of the secondary battery that do not characterize the disclosure) can be understood as matters of design choice for those skilled in the related art. The disclosure can be carried out based on contents disclosed in the present specification and common knowledge in the technical field. In the following drawings, the same reference signs are given to the members and portions that have the same effect. The dimensional relationships (length, width, thickness, etc.) in the drawings do not show the actual dimensional relationships.

Hereinafter, the disclosure will be described in detail with reference to a flat rectangular lithium ion secondary battery as an example, but it is not intended to limit the disclosure to the lithium ion secondary battery described in the embodiments. In the present specification, the term "secondary battery" refers to a general electric storage device that can be repeatedly charged and discharged, and is a term that encompasses electric storage elements such as so-called storage batteries and electric double layer capacitors. Further, in the present specification, the term "lithium ion secondary battery" refers to a secondary battery in which lithium ions are used as charge carriers and charge/discharge is realized by movement of charges through lithium ions between positive and negative electrodes.

Figure 2:
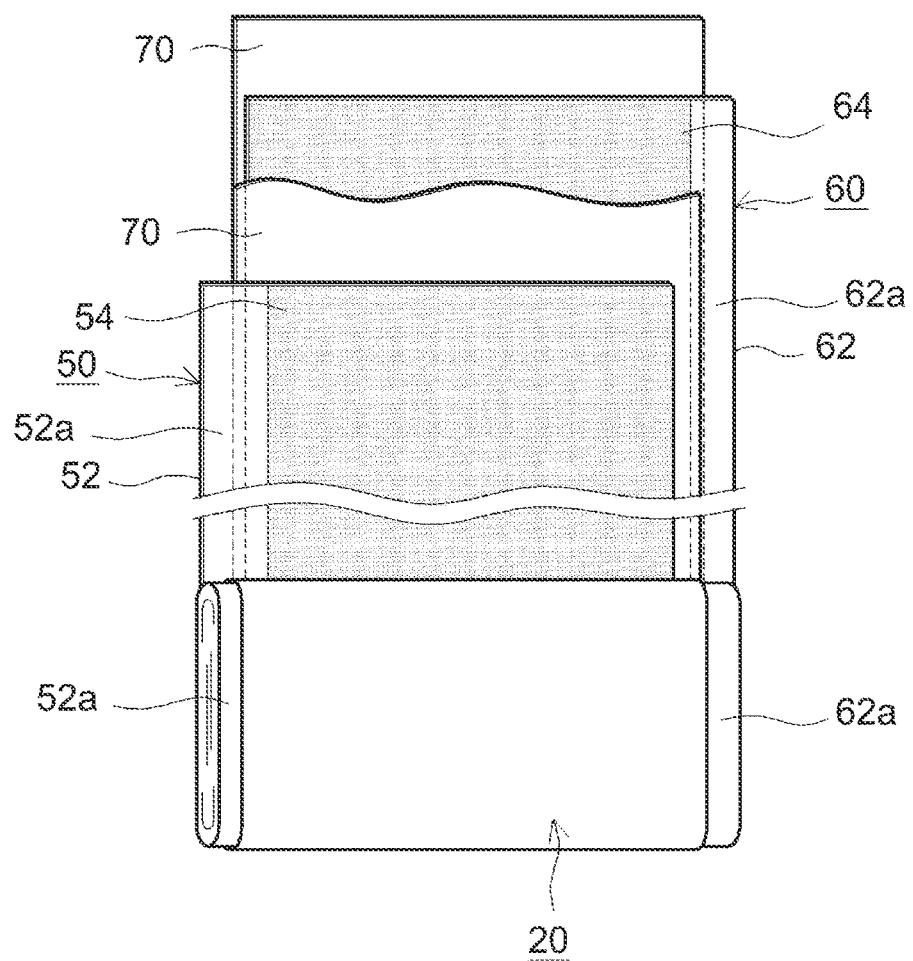
FIG. 2 is a schematic exploded view showing a configuration of a wound electrode body of the lithium ion secondary battery according to the embodiment of the disclosure.
Figure 3:
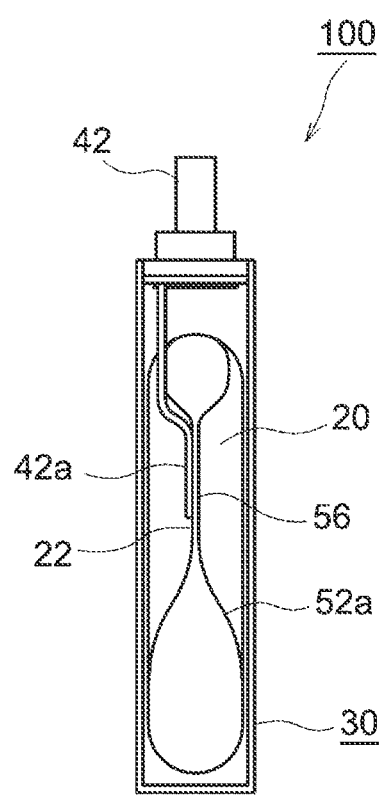
FIG. 3 is a side sectional view schematically showing the internal structure of the lithium ion secondary battery according to the embodiment of the disclosure.

FIG. 1 is a front sectional view schematically showing an internal structure of a lithium ion secondary battery according to an embodiment of the disclosure. FIG. 2 is a schematic exploded view showing a configuration of a wound electrode body of the lithium ion secondary battery according to the embodiment of the disclosure. FIG. 3 is a side sectional view schematically showing the internal structure of the lithium ion secondary battery according to the embodiment of the disclosure. In the present specification, a drawing viewed from the direction perpendicular to the wide surface of a battery case of the lithium ion secondary battery is illustrated as a front view, but this is for convenience of description and does not limit the use mode of the lithium ion secondary battery in any way.

A lithium ion secondary battery 100 shown in FIG. 1 is a sealed battery constructed by accommodating a flat wound electrode body 20 and a non-aqueous electrolyte 80 in a flat rectangular battery case (that is, an outer container) 30. A positive electrode terminal 42 and a negative electrode terminal 44 for external connection are attached to the battery case 30. The battery case 30 is provided with a thin safety valve 36 set to release the internal pressure of the battery case 30 when the internal pressure increases to a predetermined level or more, and an injection port (not shown) for injecting the non-aqueous electrolyte 80. The positive electrode terminal 42 is electrically connected to a positive electrode current collector plate 42a serving as a current collector terminal. The negative electrode terminal 44 is electrically connected to a negative electrode current collector plate 44a serving as a current collector terminal. As a material of the battery case 30, for example, a light-weight and highly heat-conductive metal material such as aluminum is used. The material of the positive electrode current collector plate 42a is, for example, aluminum. The material of the negative electrode current collector plate 44a is, for example, copper.

The wound electrode body 20 has a configuration in which, as shown in FIGS. 1 and 2, a positive electrode 50 and a negative electrode 60 are overlapped with each other via two long separator 70 and are wound in the longitudinal direction. The positive electrode 50 is configured to include a positive electrode active material layer 54 provided on one surface or both surfaces (both surfaces in the present embodiment) of a long positive electrode current collector foil 52 along the longitudinal direction. The negative electrode 60 is configured to include a negative electrode active material layer 64 provided on one surface or both surfaces (both surfaces in the present embodiment) of a long negative electrode current collector foil 62 along the longitudinal direction.

As the positive electrode 50 and the negative electrode 60, those used in the lithium ion secondary battery of the related art can be used without particular limitation. A typical mode is described below.

Examples of the positive electrode current collector foil 52 that constitutes the positive electrode 50 include aluminum foil. The positive electrode active material layer 54 contains a positive electrode active material. Examples of the positive electrode active material include lithium transition metal oxides (e.g., $LiN_{1/3}Co_{1/3}Mn_{1/3}O_2$, $LiNiO_2$, $LiCoO_2$, $LiFeO_2$, $LiMn_2O_4$, $LiN_{0.5}Mn_{1.5}O_4$), and lithium transition metal phosphate compounds (e.g., $LiFePO_4$). The positive electrode active material layer 54 may contain components other than the active material, such as a conductive material and a binder. As the conductive material, for example, carbon black such as acetylene black (AB) and other carbon materials such as graphite may be used. As the binder, for example, polyvinylidene fluoride (PVDF) or the like can be used.

Examples of the negative electrode current collector foil 62 that constitutes the negative electrode 60 include copper foil. The negative electrode active material layer 64 contains a negative electrode active material. Examples of the negative electrode active material include carbon materials such as graphite, hard carbon, and soft carbon. The negative electrode active material layer 64 may contain components other than the active material, such as a binder and a thickener. As the binder, for example, styrene butadiene rubber (SBR) or the like can be used. As the thickener, for example, carboxymethyl cellulose (CMC) or the like can be used.

Examples of the separator 70 include a porous sheet (film) made of a resin such as polyethylene (PE), polypropylene (PP), polyester, cellulose, and polyamide. Such a porous sheet may have a single-layer structure or a laminated structure of two or more layers (for example, a three-layer structure in which a PP layer is laminated on both surfaces of a PE layer). A heat resistant layer (HRL) may be provided on the surface of the separator 70. In some embodiments, the thickness of the separator 70 may be small from the viewpoint of high output and high energy density of the secondary battery. Specifically, the thickness of the separator 70 may be 5 μm or more and 25 μm or less, or 10 μm or more and 20 μm or less. Since the separator 70 having such a thickness is likely to be damaged, the effect of the disclosure is enhanced.

As shown in FIGS. 1 and 2, the positive electrode 50 has a portion where the positive electrode active material layer 54 is not formed and the positive electrode current collector foil 52 is exposed (a positive electrode current collector foil exposed portion) 52a. The positive electrode current collector foil exposed portion 52a protrudes outward from one end of the wound electrode body 20 in the winding axis direction (that is, the sheet width direction orthogonal to the longitudinal direction). Similarly, the negative electrode 60 has a portion where the negative electrode active material layer 64 is not formed and the negative electrode current collector foil 62 is exposed (negative electrode current collector foil exposed portion) 62a. The negative electrode current collector foil exposed portion 62a protrudes outward from the other end of the wound electrode body 20 in the winding axis direction. The lengths of the positive electrode current collector foil exposed portion 52a and the negative electrode current collector foil exposed portion 62a in the width direction of the electrode body 20 are not particularly limited, but may be larger than the thickness of the electrode body 20.

The lithium ion secondary battery 100 is used as a vehicle driving power source. Therefore, unlike a portable power source in which reduced thickness is required, the thickness of the electrode body 20 is 10 mm or more, and particularly 10 mm or more and 25 mm or less. When the thickness of the electrode body 20 is 10 mm or more, stress is likely to be applied to the separator adjacent to the electrode of the outermost layer of the electrode body 20, and the separator is more likely to be damaged, so that the effect of the disclosure is further enhanced.

Here, FIG. 2 is an exploded view and shows a state in which the positive electrode current collector foil exposed portion 52a and the negative electrode current collector foil exposed portion 62a are not gathered. Actually, as shown in FIGS. 1 and 3 (particularly FIG. 3), on the positive electrode 50 side, the electrode body 20 has a positive electrode side foil collecting portion 22 in which the positive electrode current collector foil exposed portion 52a is gathered. In the positive electrode side foil collecting portion 22, the positive electrode current collector foil exposed portion 52a is densely laminated in the central portion in the direction orthogonal to the width direction of the main surface of the electrode body 20 (vertical direction in the drawing). Therefore, the thickness of the positive electrode side foil collecting portion 22 is smaller than the thickness of the electrode body 20. Similarly, on the negative electrode 60 side, the electrode body 20 has a negative electrode side foil collecting portion 24 in which the negative electrode current collector foil exposed portion 62a is gathered. The positions of the positive electrode side foil collecting portion 22 and the negative electrode side foil collecting portion 24 do not have to be the central portions in the direction orthogonal to the width direction of the main surface of the electrode body 20 (the vertical direction in the drawing). In some embodiments, when the thickness of the electrode body 20 is regarded as D, the positions of the positive electrode side foil collecting portion 22 and the negative electrode side foil collecting portion 24 are distanced away from opposite ends of the electrode body 20 in the direction orthogonal to the width direction of the main surface of the electrode body 20 (vertical direction in the drawing) by D or more.

In the present embodiment, the positive electrode side foil collecting portion 22 is joined to the positive electrode current collector plate 42a by ultrasonic joining (also called ultrasonic welding). Therefore, as shown in FIG. 1, the positive electrode side foil collecting portion 22 has a positive electrode side joining mark 56 on the surface on the opposite side of the positive electrode side foil collecting portion 22 from the surface joined to the positive electrode current collector plate 42a. The negative electrode side foil collecting portion 24 is joined to the negative electrode current collector plate 44a by resistance welding. Therefore, as shown in FIG. 1, the negative electrode side foil collecting portion 24 has a negative electrode side joining mark 66 on the surface on the opposite side of the negative electrode side foil collecting portion 24 from the surface joined to the negative electrode current collector plate 44a.

Here, the positive electrode side joining mark 56 will be described in detail. The positive electrode side joining mark 56 is composed of a plurality of recesses. Specifically, the positive electrode side joining mark 56 is a set of recesses formed by the horn of the ultrasonic joining apparatus during ultrasonic joining. Thus, the entire shape of the set of recesses is regarded as the shape of the positive electrode side joining mark 56.

Figure 4:
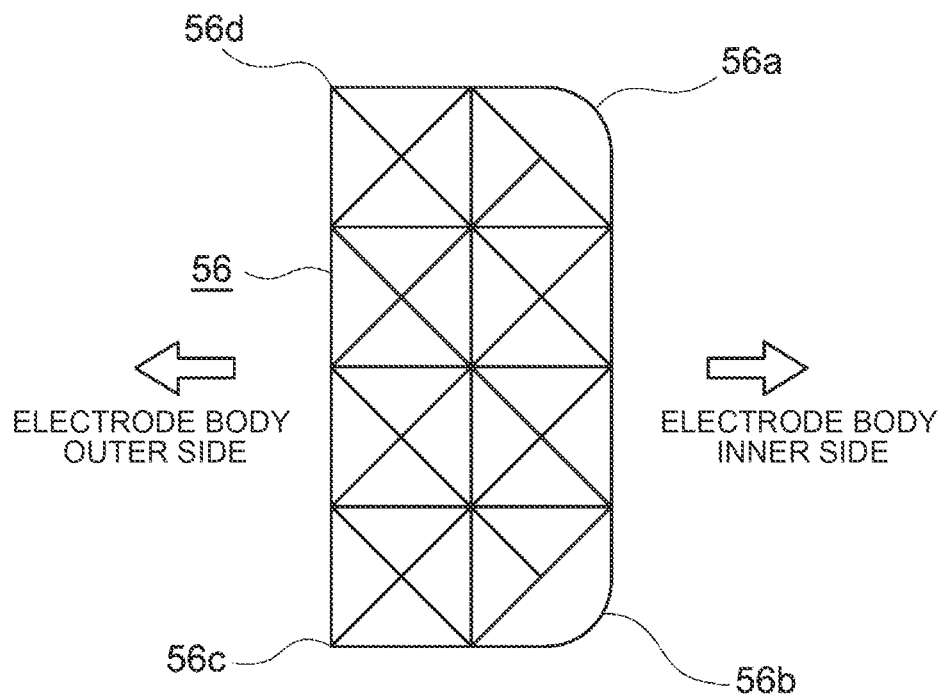
FIG. 4 is a schematic view of an example of a positive electrode side joining mark in the lithium ion secondary battery according to the embodiment of the disclosure, as viewed along a thickness direction of an electrode body.

FIG. 4 is a schematic view of an example of the positive electrode side joining mark 56 when viewed from the thickness direction of the electrode body 20. In the illustrated example, the positive electrode side joining mark 56 has a shape in which 2×4 inverted quadrangular pyramid-shaped recesses are arranged side by side, which correspond to the tip shape of the horn because the ultrasonic joining is performed with a horn having a tip shape in which 2×4 quadrangular pyramids are arranged side by side. The number of the recesses constituting the positive electrode side joining mark 56 is not limited to this as long as it is plural. The arrangement of the recesses constituting the positive electrode side joining mark 56 is not limited to this.

The shape of the positive electrode side joining mark 56 (that is, the entire shape of the set of the recesses) is a substantially rectangular shape in a plan view (that is, when viewed from the thickness direction of the electrode body 20). Thus, the positive electrode side joining mark 56 has two corners 56a and 56b on the inner side of the electrode body 20 and two corners 56c and 56d on the outer side of electrode body 20. The corners 56a and 56b on the inner side of electrode body 20 have a chamfered shape. In the illustrated example, the corners 56a and 56b are chamfered to have a round shape. On the other hand, the corners 56c and 56d on the outer side of the electrode body 20 have a shape that is not chamfered. Thus, the angles of the corners 56c and 56d on the outer side of the electrode body 20 are substantially right angles.

Figure 5:
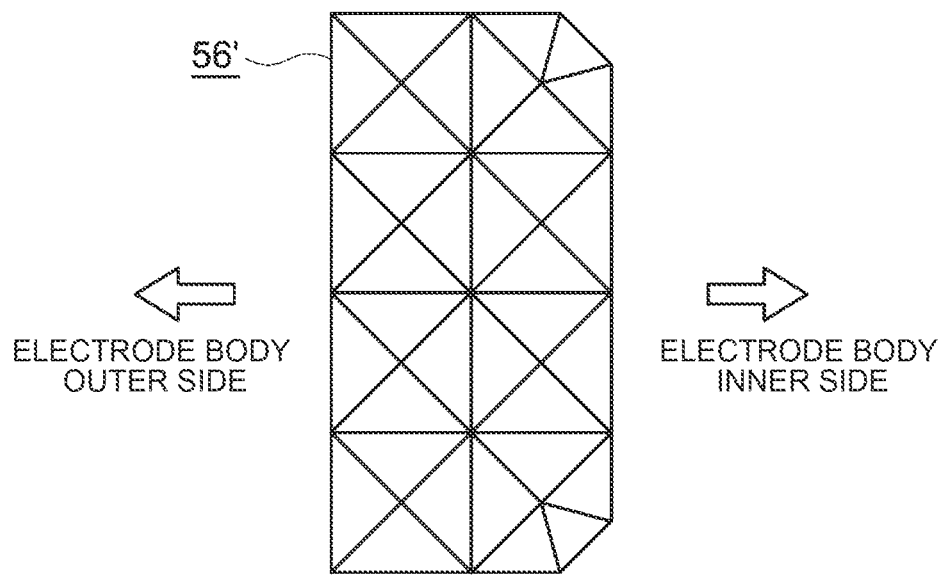
FIG. 5 is a schematic view of another example of a shape of the positive electrode side joining mark in the lithium ion secondary battery according to the embodiment of the disclosure.

The shape of the chamfered corners is not particularly limited, and is therefore not limited to the round shape. FIG. 5 shows another example of the positive electrode side joining mark. In FIG. 5, the corners of a positive electrode side joining mark 56' on the inner side of electrode body 20 have a linearly chamfered shape.

Figure 6:
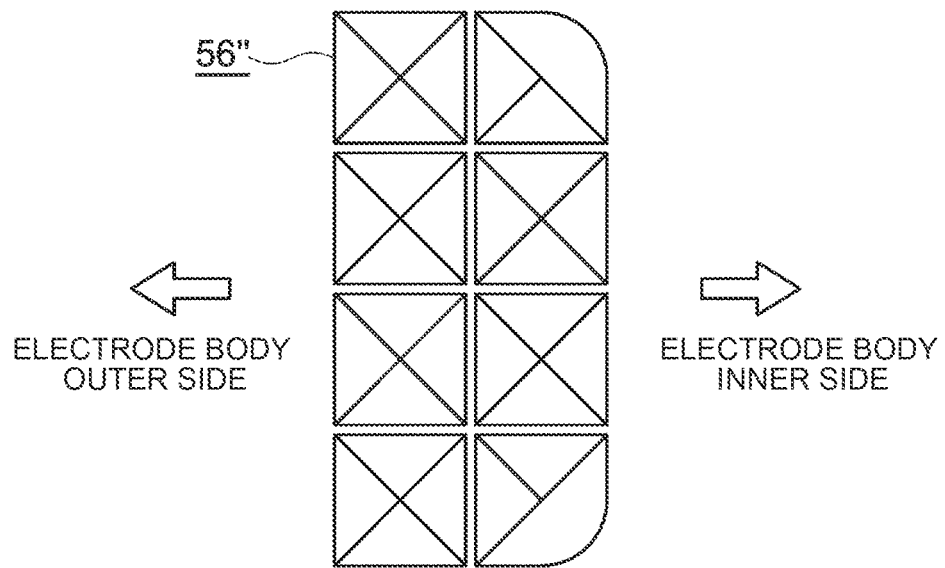
FIG. 6 is a schematic view of still another example of a shape of the positive electrode side joining mark in the lithium ion secondary battery according to the embodiment of the disclosure.

FIG. 6 shows another example of the positive electrode side joining mark. A positive electrode side joining mark 56" shown in FIG. 6 is composed of 2×4 inverted quadrangular pyramid-shaped recesses, but has gaps between the recesses. However, when the set of eight recesses is viewed as a whole, the positive electrode side joining mark 56" has a substantially rectangular shape. That is, when there are gaps between the recesses, the shape of a contour obtained by extending and connecting the outer sides of the recesses can be regarded as the entire shape of the set of the recesses, and is a substantially rectangular shape in the illustrated example. Therefore, corners on the corner side of the recesses in the set of the recesses in a plan view (that is, when viewed from the thickness direction of the electrode body 20) constitute the corners of the positive electrode side joining mark 56". The corners of the positive electrode side joining mark 56" on the inner side of the electrode body 20 are chamfered to have a round shape. As described above, there may be gaps between the recesses as long as the entire shape of the joining mark can be grasped as the set of the recesses. In some embodiments, the size of the gaps may be 100% or less of the size of the recess in the arrangement direction of the recesses.

Figure 7:
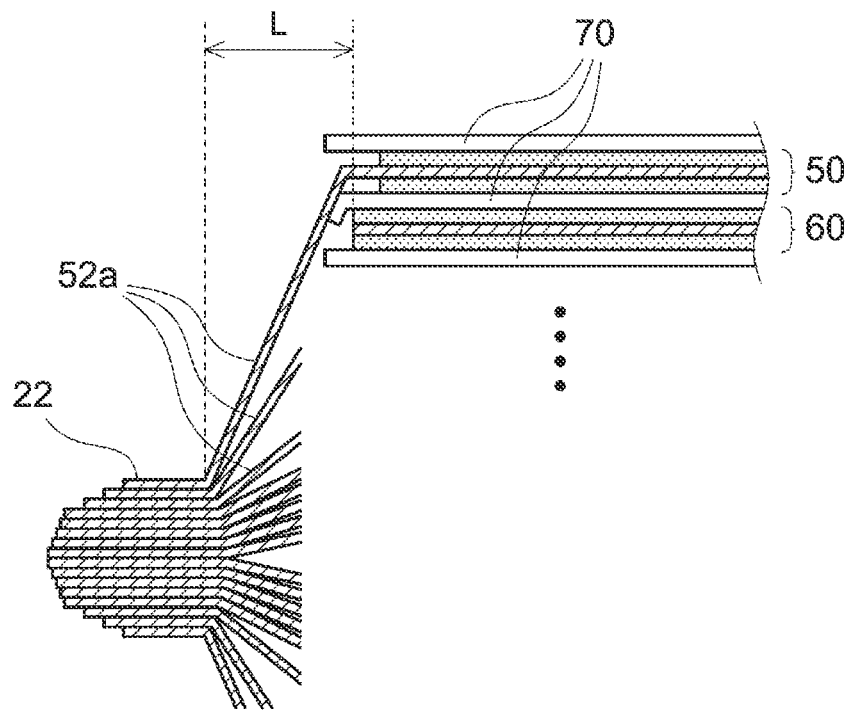
FIG. 7 is a partial view of the electrode body for describing damage of a separator.

With the positive electrode side joining marks 56, 56', 56" having such shapes, a secondary battery can be configured in which the separator is less likely to be damaged and the generation of coarse foreign matter is suppressed during ultrasonic joining at manufacture. The reason for this will be described below. FIG. 7 is a partial view of the electrode body 20 for describing damage of the separator. The electrode body 20 is a laminated body having a thickness of 10 mm or more. When the distance (distance L in FIG. 7) between the end of the positive electrode side foil collecting portion 22 on the inner side of the electrode body 20 and the end of the negative electrode active material layer 64 in the width direction of the electrode body 20 (right-left direction in the drawing) is reduced, as shown in FIG. 7, the positive electrode current collector foil exposed portion 52a is greatly bent in the outer layer of the electrode body 20, particularly in the electrode of the outermost layer (the positive electrode 50 in FIG. 7). As a result, the separator 70 adjacent to the positive electrode 50 that is the electrode of the outermost layer is bent and interposed between the negative electrode 60 and the positive electrode current collector foil exposed portion 52a. Therefore, stress is generated in the portion where the separator 70 is interposed. If the positive electrode side foil collecting portion 22 and the positive electrode current collector plate 42a are joined by ultrasonic joining in this state, the separator 70 is likely to be damaged due to vibration during joining and reduced thickness of the separator 70. However, in the present embodiment, the corners of the positive electrode side joining mark 56 on the inner side of the electrode body 20 have a chamfered shape. When ultrasonic welding is performed so that such a joining mark is formed (that is, when ultrasonic welding is performed using a horn having a shape corresponding to the joining mark), vibration transmitted to the stressed portion of the separator 70 can be reduced. As a result, damage to the separator 70 can be suppressed.

When the thickness of the electrode body 20 is regarded as D, the thickness D and the distance L between the end of the positive electrode side foil collecting portion 22 on the inner side of electrode body 20 and the end of the negative electrode active material layer 64 may satisfy $0.5D \leq L \leq 2D$, or may satisfy $0.7D \leq L \leq 1.5D$.

In ultrasonic joining, the positive electrode current collector plate 42a is placed on the anvil of the ultrasonic joining apparatus, and a load is applied from the horn toward the anvil, so that the anvil digs into the surface of the positive electrode current collector plate 42a. When this portion receives vibration from the horn, the positive electrode current collector plate 42a may be cut and coarse foreign matter (for example, having a particle size of 100 μm or more) may be generated. The generation of the foreign matter is likely to occur in a portion of the positive electrode current collector plate 42a on the outer side of the electrode body 20. However, in the present embodiment, the corners of the positive electrode side joining mark 56 on the outer side of the electrode body 20 are not chamfered. When ultrasonic welding is performed so that such a joining mark is formed (that is, when ultrasonic welding is performed using a horn having a shape corresponding to the joining mark), the load applied from the horn is sufficiently transmitted to the contact portion between the positive electrode current collector plate 42a and the anvil on the outer side of the electrode body 20, and excessive vibration in the above portion can be suppressed. Thus, the generation of the coarse foreign matter (for example, having a particle size of 100 μm or more) can be suppressed.

On the other hand, the negative electrode side joining mark 66 is formed by resistance welding and has the same shape as that in the related art. Generally, the positive electrode side foil collecting portion 22 and the positive electrode current collector plate 42a are ultrasonically joined, so in the illustrated example, only the positive electrode side joining mark 56 has the two corners 56a and 56b on the inner side of the electrode body 20 and the two corners 56c and 56d on the outer side of the electrode body 20, and only the two corners 56a and 56b on the inner side of the electrode body 20 have a chamfered shape. However, ultrasonic joining may also be adopted on the negative electrode side. Thus, in addition to the positive electrode side joining mark 56, the negative electrode side joining mark 66 may also have two corners on each of the inner side of the electrode body 20 and the outer side the electrode body 20, respectively, and only the two corners on the inner side of electrode body 20 may have a chamfered shape. Alternatively, only the negative electrode side joining mark 66 may have two corners on each of the inner side of the electrode body 20 and the outer side of the electrode body 20, and only the two corners on the inner side of the electrode body 20 may have a chamfered shape.

The non-aqueous electrolyte 80 typically contains a non-aqueous solvent and a supporting salt. As the non-aqueous solvent, organic solvents such as various carbonates, ethers, esters, nitriles, sulfones, and lactones used in the electrolyte of a general lithium ion secondary battery can be used without particular limitation. In some embodiments, the organic solvent may be carbonates, and specific examples thereof include ethylene carbonate (EC), propylene carbonate (PC), diethyl carbonate (DEC), dimethyl carbonate (DMC), ethylmethyl carbonate (EMC), monofluoroethylene carbonate (MFEC), difluoroethylene carbonate (DFEC), monofluoromethyldifluoromethyl carbonate (F-DMC), and trifluorodimethyl carbonate (TFDMC). Such non-aqueous solvents can be used singly or in appropriate combination of two or more. In some embodiments, the supporting salt, for example, lithium salts such as $LiPF_6$, $LiBF_4$, and $LiClO_4$ may be used. In some embodiments, the concentration of the supporting salt may be 0.7 mol/L or more, or 1.3 mol/L or less.

The non-aqueous electrolyte 80 can include, as long as the effect of the disclosure is not significantly impaired, various additives including a gas generating agent such as biphenyl (BP), cyclohexylbenzene (CHB); a film forming agent such as an oxalato complex compound containing a boron atom and/or a phosphorus atom and vinylene carbonate (VC); a dispersant; and a thickener.

An example of the method for manufacturing the lithium ion secondary battery 100 will be described below. The following method is an example in which the ultrasonic joining is performed on the positive electrode side. In the manufacturing method, the step of preparing the electrode body 20 including the positive electrode 50, the negative electrode 60, and the separator 70 is first performed. The electrode body 20 is the electrode body 20 described above. Thus, the positive electrode 50 has the positive electrode current collector foil 52 and the positive electrode active material layer 54 provided on the positive electrode current collector foil 52. The positive electrode 50 also has the positive electrode current collector foil exposed portion 52*a* where the positive electrode current collector foil 52 is exposed. The electrode body 20 has the positive electrode side foil collecting portion 22 in which the positive electrode current collector foil exposed portion 52*a* is gathered. This step can be performed in the same manner as a known method.

Next, a step of interposing the positive electrode side foil collecting portion 22 of the electrode body 20 and the positive electrode current collector plate 42*a* serving as the current collector terminal between the horn of the ultrasonic joining apparatus and the anvil of the ultrasonic joining apparatus is performed. Here, the positive electrode side foil collecting portion 22 contacts the horn, and the positive electrode current collector plate 42*a* contacts the anvil. Here, the tip of the horn used has a plurality of protrusions. The tip shape of the horn has four corners in a section perpendicular to the protruding direction of the protrusions (that is, the tip direction of the horn). Only two corners thereof are chamfered, and the two chamfered corners are adjacent to each other. Further, in this step, the two chamfered corners are disposed on the inner side of electrode body 20. Other items in this step can be performed in the same manner as a known method.

Next, a step of vibrating the horn while pressing the horn toward the anvil to ultrasonically join the positive electrode side foil collecting portion 22 and the positive electrode current collector plate 42*a* is performed. This step can be performed in the same manner as a known method.

Next, the step of constructing the lithium ion secondary battery 100 is performed using the electrode body 20 to which the positive electrode current collector plate 42*a* is attached. This step can be performed in the same manner as a known method. In the above, ultrasonic joining is performed only on the positive electrode side, but the ultrasonic joining can be similarly performed on the negative electrode side using the horn having the above-described tip shape.

The lithium ion secondary battery 100 configured as described above may be used as a driving power source mounted on vehicles such as electric vehicles (EVs), hybrid vehicles (HVs), and plug-in hybrid vehicles (PHVs). Further, the lithium ion secondary battery 100 configured as described above can also be used as a storage battery for a household power storage system or an industrial power storage system. The lithium ion secondary battery 100 can also be used in the mode of an assembled battery, in which a plurality of batteries is typically connected in series and/or in parallel.

The rectangular lithium ion secondary battery 100 including the flat wound electrode body 20 has been described as an example. However, the lithium ion secondary battery can also be configured as a lithium ion secondary battery including a laminated electrode body in which a plurality of positive electrode sheets and a plurality of negative electrode sheets are alternately laminated via separators. In addition, the technology disclosed herein is also applicable to secondary batteries other than the lithium ion secondary battery.

Test examples of the disclosure will be described below, but it is not intended to limit the disclosure to the test examples described below.

Test Examples A1, A2, B1, and B2

Ultrasonic Joining

A positive electrode having a positive electrode active material layer formed on an aluminum foil, a negative electrode having a negative electrode active material layer formed on a copper foil, and a PP/PE/PP three-layer porous sheet having a thickness of 20 µm and serving as a separator were prepared. The positive electrode and the negative electrode were each provided with a current collector foil exposed portion where the active material layer was not provided and the foil was exposed. A positive electrode, a negative electrode, and a separator were laminated and wound to prepare a wound electrode body. The wound electrode body had a thickness of 11.5 mm. A current collector portion was formed by bundling the positive electrode current collector foil exposed portion at the end of the electrode body. Ultrasonic joining was performed on the current collector portion so that joining marks having the shapes shown in FIGS. 4, 5, 8 and 9 were formed. Specifically, horns having tip shapes with protrusions corresponding to the shapes shown in FIGS. 4, 5, 8 and 9 were prepared and attached to an ultrasonic joining apparatus having an anvil. A current collector plate made of aluminum was disposed below the current collector portion of the electrode body, and the current collector plate and the current collector portion were interposed between the horn and the anvil so that the prepared horn was brought into contact with the current collector portion and the anvil was brought into contact with the current collector plate. At this time, the horn was brought into contact with the current collector portion so that the right sides of FIGS. 4, 5, 8 and 9 correspond to the inner side of the electrode body, and the left sides of FIGS. 4, 5, 8 and 9 correspond to the end side of the electrode body. Ultrasonic metal joining was performed in this state to join the current collector portion and the current collector plate of the positive electrode. With this joining, joining marks having the shapes shown in FIGS. 4, 5, 8 and 9 were formed on the current collector portion.

Evaluation

With respect to the electrode bodies subjected to ultrasonic joining of the above Test Examples, the end portion of the separator on the joining side was observed using a magnifying glass to check whether the separator was damaged. The results are shown in Table 1. Further, an adhesive tape was applied to the surface of the electrode plate joined to the electrode body, which had been in contact with the anvil, and was pressed and then peeled off. The adhesive surface of the adhesive tape was observed using a microscope to examine whether there was foreign matter of 100 μm or more. The results are shown in Table 1.

TABLE 1

Figure 8:
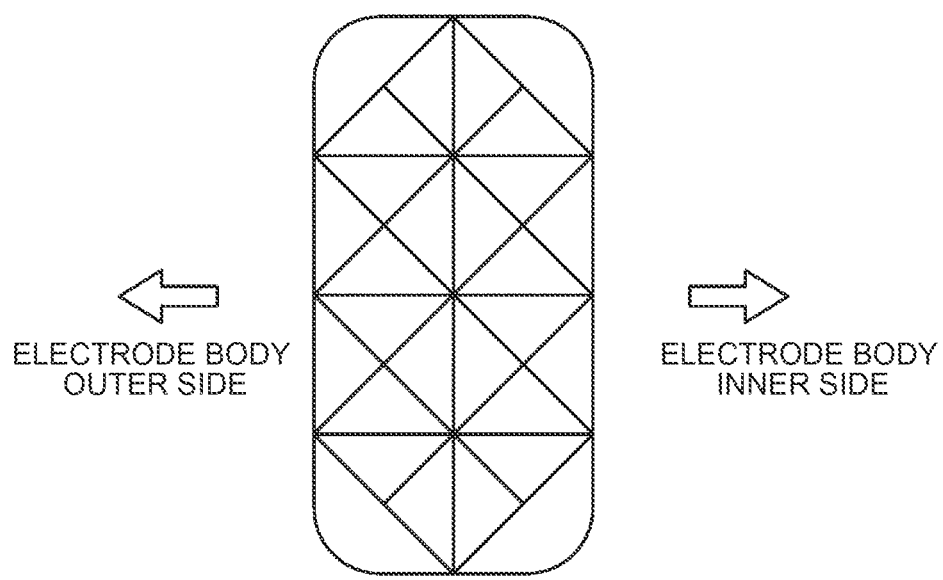
FIG. 8 is a schematic view of a joining mark in Test Example B1 as viewed along the thickness direction of the electrode body.
Figure 9:
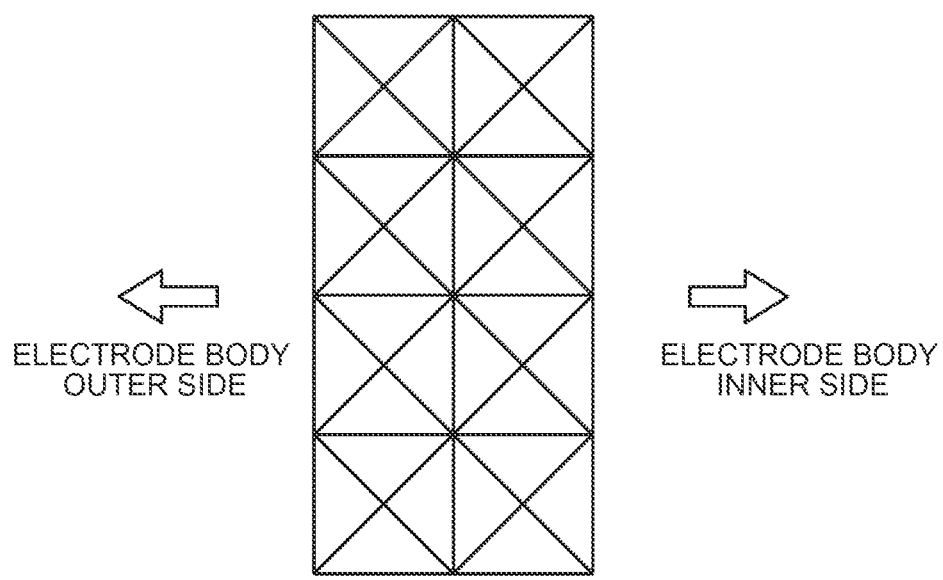
FIG. 9 is a schematic view of a joining mark in Test Example B2 as viewed along the thickness direction of the electrode body.

|  | Horn shape | Damage of separator | Generation of foreign matter of 100 μm or more |
|---|---|---|---|
| Test Example A1 | FIG. 4 | Not found | Not found |
| Test Example A2 | FIG. 5 | Not found | Not found |
| Test Example B1 | FIG. 8 | Not found | Found |
| Test Example B2 | FIG. 9 | Found | Not found |

As can be understood from Table 1, when the joining mark has corners on the inner side of the electrode body and on the outer side of the electrode body, and only the corners on the inner side of the electrode body have a chamfered shape (that is, in Test Examples A1 and A2), both the damage of the separator and the generation of the foreign matter of 100 μm or more can be suppressed. From the above results, according to the secondary battery disclosed herein, damage to the separator is unlikely to occur and the generation of the coarse foreign matter is suppressed during ultrasonic joining at manufacture.

Specific examples of the disclosure have been described above in detail, but these are merely examples and do not limit the disclosure. The technology described in the claims includes various modifications and changes of the specific examples illustrated above.

What is claimed is:

1. A secondary battery comprising:
   an electrode body including a positive electrode, a negative electrode, and a separator;
   a battery case accommodating the electrode body; and
   electrode terminals attached to the battery case and including a positive electrode terminal and a negative electrode terminal; wherein:
   at least one of the positive electrode and the negative electrode has an electrode current collector foil and an electrode active material layer provided on the electrode current collector foil;
   the at least one of the positive electrode and the negative electrode has an exposed portion where the electrode current collector foil is exposed;
   the electrode body has a foil collecting portion in which the exposed portion is gathered;
   the electrode terminal corresponding to the at least one of the positive electrode and the negative electrode is electrically connected to the foil collecting portion via a current collector terminal;
   the current collector terminal is joined to the foil collecting portion;
   the foil collecting portion has a joining mark composed of a plurality of recesses on a surface on an opposite side of the foil collecting portion from a surface joined to the current collector terminal; and
   the joining mark has two corners on an inner side of the electrode body and two corners on an outer side of the electrode body, and only the two corners on the inner side of the electrode body have a chamfered shape.

2. The secondary battery according to claim 1, wherein the electrode body has a thickness of 10 mm or more.

3. The secondary battery according to claim 1, wherein the secondary battery is a secondary battery used as a vehicle driving power source.

4. The secondary battery according to claim 1, wherein the separator has a thickness of 5 μm or more and 25 μm or less.

5. The secondary battery according to claim 2, wherein the electrode body has a thickness of 25 mm or less.

6. The secondary battery according to claim 4, wherein the separator has a thickness of 10 μm or more and 20 μm or less.

7. The secondary battery according to claim 1, wherein a length of the exposed portion is larger than a thickness of the electrode body.

8. The secondary battery according to claim 1, wherein:
   the positive electrode has a positive electrode current collector foil and a positive electrode active material layer provided on the positive electrode current collector foil;
   the negative electrode has a negative electrode current collector foil and a negative electrode active material layer provided on the negative electrode current collector foil;
   the positive electrode has a positive electrode current collector foil exposed portion where a part of the positive electrode current collector foil is exposed;
   the negative electrode has a negative electrode current collector foil exposed portion where a part of the negative electrode current collector foil is exposed;
   the electrode body has a positive electrode side foil collecting portion in which the positive electrode current collector foil exposed portion is gathered, and a negative electrode side foil collecting portion in which the negative electrode current collector foil exposed portion is gathered;
   the positive electrode terminal corresponding to the positive electrode is electrically connected to the positive electrode side foil collecting portion via a positive electrode current collector terminal;
   the negative electrode terminal corresponding to the negative electrode is electrically connected to the negative electrode side foil collecting portion via a negative electrode current collector terminal;
   the positive electrode current collector terminal is joined to the positive electrode side foil collecting portion;
   the negative electrode current collector terminal is joined to the negative electrode side foil collecting portion;
   the positive electrode side foil collecting portion has a positive electrode side joining mark composed of a plurality of recesses on a surface on an opposite side of the positive electrode side foil collecting portion from a surface joined to the positive electrode current collector terminal;
   the negative electrode side foil collecting portion has a negative electrode side joining mark on a surface on an opposite side of the negative electrode side foil collecting portion from a surface joined to the negative electrode current collector terminal; and at least one of the positive electrode side joining mark and the negative electrode side joining mark has two corners on the inner side of the electrode body and two corners on the outer side of the electrode body, and only the two corners on the inner side of the electrode body have a chamfered shape.

\* \* \* \* \*